United States Patent [19]

Kumm

[11] 4,132,064
[45] Jan. 2, 1979

[54] TURBINE ENGINE WITH DIFFERENTIAL GEARING BETWEEN HIGH PRESSURE TURBINE AND COMPRESSOR

[75] Inventor: Emerson L. Kumm, Tempe, Ariz.

[73] Assignee: The Garrett Corporation, Los Angeles, Calif.

[21] Appl. No.: 800,664

[22] Filed: May 26, 1977

[51] Int. Cl.[2] .............................. F02C 7/26; F02C 3/10
[52] U.S. Cl. ................................ 60/39.14; 60/39.16 R; 60/39.51 R
[58] Field of Search ........ 60/39.15, 39.16 R, 39.16 C, 60/39.16 S, 39.51 R, 39.14, 236, 268

[56] References Cited

U.S. PATENT DOCUMENTS

| | | | |
|---|---|---|---|
| 2,693,080 | 11/1954 | Hutchinson | 60/39.28 R |
| 2,811,302 | 10/1957 | Hodge et al. | 60/39.16 R |
| 2,955,424 | 10/1960 | Hryniszak | 60/39.29 |
| 2,960,825 | 11/1960 | Sampietro et al. | 60/39.16 S |
| 3,524,318 | 8/1970 | Baugen et al. | 60/268 |

*Primary Examiner*—Louis J. Casaregola
*Attorney, Agent, or Firm*—Herschel C. Omohundro; James W. McFarland; Albert J. Miller

[57] ABSTRACT

The subject engine includes two turbocompressor units, the first a relatively low pressure device having a rotor with mechanically connected turbine wheel and compressor impeller elements. The second unit has separated turbine wheel and compressor impeller pieces with power being transmitted from the turbine wheel to the compressor impeller through a differential gear assembly. In operation, the compressor of the first unit supplies compressed air to the second unit which increases the pressure of the air and supplies it to a combustor where fuel is added and burned to generate high temperature high pressure gases. These gases are first applied to the turbine of the second unit then to the turbine of the first unit after which they may be passed through a recuperator to heat the compressed air from the compressor of the second unit before it is introduced into the combustor. The differential gear assembly has an output shaft leading to a torque converter or other power transferring mechanism. Such assembly also has a power takeoff gear train for supplying power to an accessory drive. A starter motor is also selectively connected with the differential to initiate rotation of the compressor and turbine of the second turbocompressor unit in the engine starting operation. A clutch controlled power transfer path is provided to connect the output shaft and predetermined parts of the differential during the starting and braking steps of operation. To enhance the efficiency of the engine one or both compressors may be equipped with rotary inlet guide vanes while each turbine may be provided with variable nozzles.

21 Claims, 4 Drawing Figures

TURBINE ENGINE WITH DIFFERENTIAL GEARING BETWEEN HIGH PRESSURE TURBINE AND COMPRESSOR

BACKGROUND OF THE INVENTION

The invention herein pertains to power units employing gas turbines and designed particularly for use in driving land vehicles which have widely varying operating conditions such as occur when the vehicle is idling, accelerating, cruising, decelerating, carrying light, intermediate, and heavy loads, and traversing upwardly and downwardly inclined and level roads. During such operating conditions it is desirable to maintain as high efficiency of operation as possible.

This invention relates generally to power systems and is more particularly directed to a power system designed specifically for use in a land vehicle and having a gas turbine as the main part with a turbosupercharged hot gas generating system as a secondary part to supply motivating fluid to the main part.

One of the objects of this invention is to provide a power unit having a main driving section and a secondary section for supplying the motivating fluid for the driving section, the secondary section having mechanism driven in part mechanically by the main driving section and in part by the energy remaining in the exhausted motivating fluid from the main driving section.

Another object of the invention is to provide the power unit mentioned in the preceding paragraph with elements to modify the motivating fluid at various stages of its preparation for the main driving section to improve the overall efficiency of the power unit as well as to reduce the output of noxious fluids during its operation, A more specific object of the invention is to utilize a gas turbine as the main driving section in the power unit mentioned in the preceding paragraphs and a high pressure compressor as part of the secondary section, a differential gearing setup being employed to transmit power from the gas turbine to the high pressure compressor, the differential gearing setup including means for establishing predetermined gear ratios between the turbine and high pressure compressor at selected stages of operation of the power unit.

A further object of the invention is to provide a power unit of the type mentioned in the preceding objects in which the secondary section has a supercharger including a rotor with connected turbine wheel and compressor impeller parts, the latter supplying relatively low pressure air to the inlet of the high pressure compressor in response to the application of exhaust fluid from the gas turbine of the main driving section to the turbine wheel of the supercharger, the fluid exhausted from the turbine wheel of the supercharger being passed through a recuperator to utilize heat energy remaining in such fluid.

Still further objects reside in providing the secondary section of a power unit, such as mentioned above, with an intercooler between the supercharger and the high pressure compressor to reduce the initial heat of the pre-compressed air and premit a higher compression of the air with less effort in the high pressure compressor. Also in providing the compressors of the driving and secondary sections with rotary inlet guide vanes which can be controlled to permit such compressors to operate at higher speeds with reduced flows without surging in much the same fashion as conventional inlet guide vanes but with advantages in control simplicity and equipment cost.

It is an object also to provide the turbines of the driving and secondary sections with varible nozzles to control the power and speed of these turbines and consequently such characteristics of the power unit.

Other objects and advantages will be apparent from the following part of the description of one form of the invention selected for illustration in the accompanying drawings.

IN THE DRAWINGS

DESCRIPTION

Figure 1:
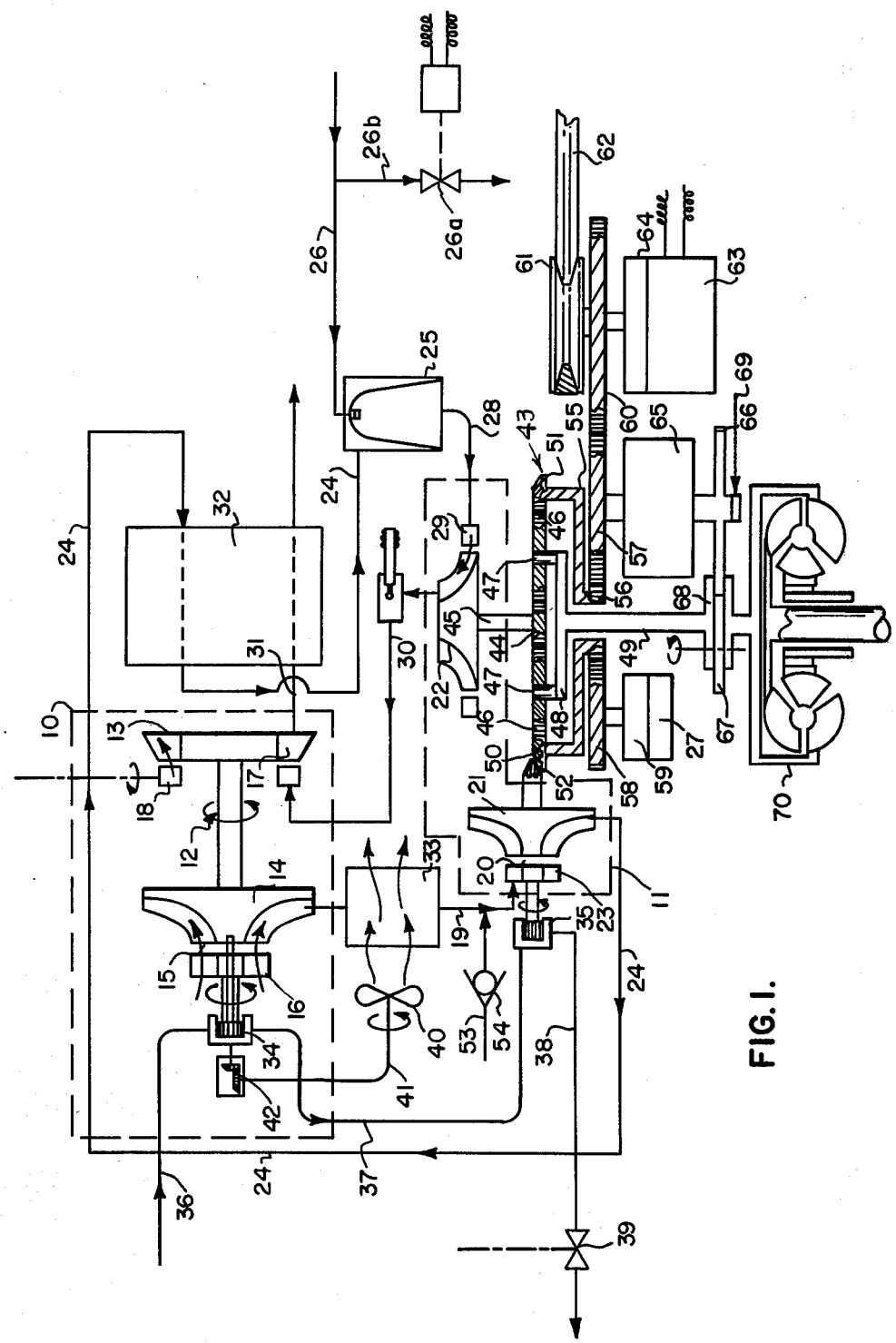
FIG. 1 is a schematic diagram illustrating the flow of motivating fluid and power in a power unit formed in accordance with the present invention.
Figure 2:
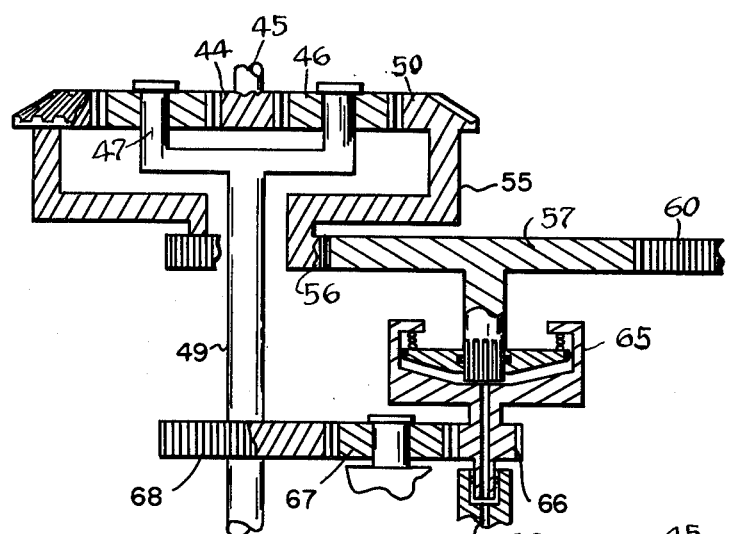
FIG. 2 is a schematic view in section showing a path for power during certain phases of operation of the power unit.
Figure 3:
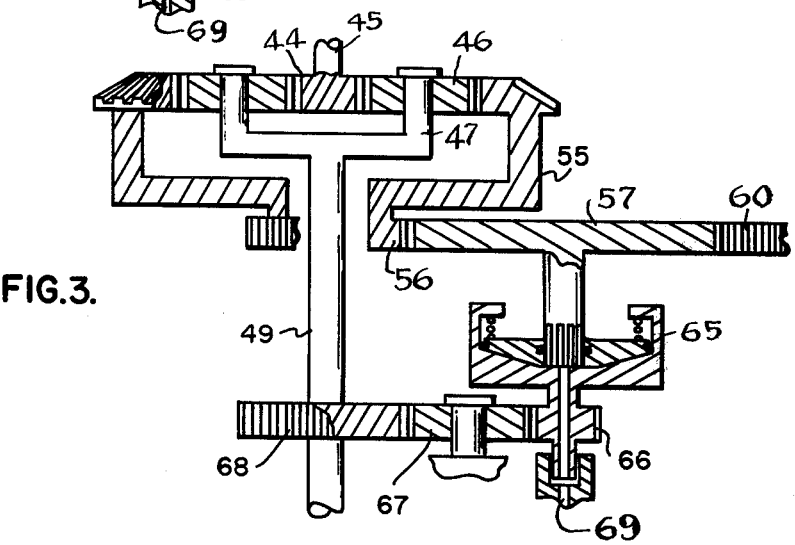
FIG. 3 is a similar view of a portion of the mechanism shown in FIG. 2 with parts in a different condition during another phase of operation; and, FIG. 4 is a horizontal sectional view taken through a part of the differential gear mechanism.
Figure 4:
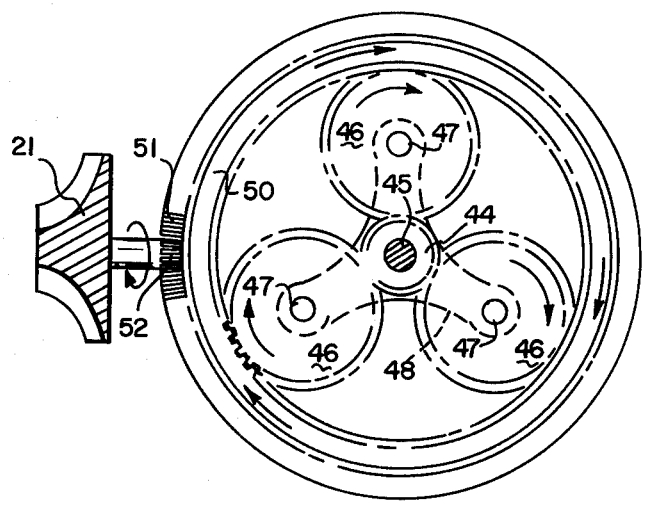

Particular reference to FIG. 1 of the drawings will show that a power unit formed in accordance with the invention includes in general two main parts, the first being a low pressure turbocompressor unit 10 and the second, a high pressure turbocompressor unit 11.

The unit 10, in the form of the invention selected for illustration, has a rotor 12 with connected elements comprising a turbine wheel 13 and impeller 14. The inlet 15 for the impeller 14 may be provided with a rotary inlet guide vane system 16, such as is shown in U.S. Pat. No. 3,918,828 issued Nov. 11, 1975 to Emerson L. Kumm. The turbine wheel 13 is illustrated as having axial flow blades 17 with variable inlet nozzle vanes 18. It should be obvious that other types of turbines could be employed with equal facility. Rotation of the turbine wheel 13 will impart similar motion to the compressor impeller drawing air between the guide vanes 16 into the inlet of the impeller and discharging such air under some predetermined pressure into a collector (not shown) surrounding the periphery of the impeller. This pre-compressed air will pass through line 19 to the inlet 20 of a second impeller 21 included in the high pressure turbocompressor unit 11.

It will be noted from FIG. 1, that unit 11 has separated or independently rotatable turbine wheel and compressor impeller elements, the turbine wheel being designated by numeral 22 and the impeller by numeral 21 as indicated above. As shown in FIG. 1 the inlet to impeller 21 of the high pressure compressor unit 11 may also be provided with rotary inlet guide vanes 23 of the type shown in U.S. Pat. No. 3,918,828. Air supplied to impeller 21 will be discharged from the periphery thereof and will flow through line 24 to a suitable combustor 25 to which fuel is supplied under pressure through line 26 leading from a power driven pump 27. Fuel flow to the combustor is controlled by an electromagnetic valve 26a disposed in a fuel return line 26b branching from line 26 and leading to the inlet of pump 27. The air and fuel mixture will be burned in the combustor 25, the resulting hot high pressure gases being conducted through passage 28 to the inlet of turbine 22. As with the turbine of the low pressure turbocompressor unit 10, the turbine 22 may be equipped with variable nozzle vanes 29 which direct the hot gases against the blades of the turbine wheel and impart rotary movement thereto. The gases exhausting from turbine 22 flow through line 30 to the inlet of turbine 13 being directed by nozzle vanes 18 against the blades 17 to drive the turbine 13 and impeller 14. Spent gases flow from turbine 13 through line 31.

To utilize latent heat in the gases exhausted from turbine 13, line 31 includes passages in a recuperator 32 which serves to pass the compressed air from the high pressure compressor 21 through heat exchange relationship with such exhaust gases after which the latter may be conducted to a suitable discharge point.

It may be found desirable to dispose an intercooler 33 in line 19 between the low pressure and high pressure compressors to remove heat from the pre-compressed air supplied to the high pressure compressor. This step obviously reduces the power required by the high pressure compressor and thus increases the efficiency of the power unit. The efficiency of the unit may be further increased through the use of the compressor flow control devices 16 and 23 at the inlets of the low and high pressure compressors, respectively. As in U.S. Pat. No. 3,918,828, the devices 16 and 23 have positive displacement pumps 34 and 35 connected therewith, fluid lines 36, 37, and 38 leading to, between, and from such pumps. Valve means 39 are disposed in one of these lines, line 38 in this instance, to control fluid flow to and from the pumps and consequently the rotation of the guide vanes. In this manner the operation of the compressors at varying flows may be governed to secure the most satisfactory results. The variable position guide vanes significantly reduce the compressor efficiency losses when operating at reduced flows. To improve the effect of the intercooler 33, a fan 40 is provided to force ambient air through the intercooler, the fan being connected via a shaft 41 and gearing 42 with one of the fluid pumps or motors 34, 35 which are driven by the guide vanes in response to air flowing into the compressors.

It will be noted from FIG. 1 that a differential gear mechanism, designated generally by the numeral 43, is disposed between the high pressure turbine 22 and the high pressure compressor 21. In the form of the invention selected for illustration, the mechanism 43 includes a sun gear 44 fixed to the shaft 45 of the turbine 22. Gear 44 meshes with planet gears 46 mounted for rotation on spindles 47 of a carrier 48 having a shaft 49 registering axially with the turbine shaft 45. Planet gears 46 mesh with internal teeth formed on a ring gear 50 surrounding the planets and supported for rotation about the axes of shafts 45 and 49. The outer edge of the ring gear, in the form of the invention shown, is provided with bevel teeth 51 which mesh with similar teeth of a pinion 52 fixed to the shaft of the high pressure compressor impeller 21. When turbine 22 is driven in response to forces applied thereto by the hot high pressure gases, sun gear 44 will revolve in unison therewith. This rotation will in turn rotate planet gears 46 and since these gears mesh with teeth on the ring gear 50 the latter will be caused to rotate also. Rotation of the ring gear imparts rotary movement to the impeller 21 through the bevel gear 51 and pinion 52. Rotation of impeller 21 increases the compression of air flowing from compressor 14 and, as mentioned above, supplies the high pressure air to the combustor 25. The temperature of this high pressure air is increased through heat exchange with exhaust gases from turbine 13 in the recuperator 32.

To reduce the initial starting load of the high pressure turbocompressor unit, a branch line 53 may be connected with line 19 in advance of inlet 20 of the high pressure compressor 21. Branch line 53 is provided with a check valve 54 designed to permit air flow toward compressor 21 only and prevent flow from line 19 toward the inlet end of the branch line 53. It will be seen that during the initial rotation of impeller 21 air may flow to the inlet of such impeller without having to pass through the low pressure compressor and the attendant lines. During the operation of starting turbine 22 exhaust gases therefrom will impart rotation to turbine 13 causing the low pressure impeller 14 to draw air into its inlet and discharge air through line 19 to the high pressure compressor. When the pressure created by impeller 14 increases sufficiently check valve 54 will close and all the air for the high pressure compressor will be supplied by the low pressure compressor.

From FIG. 1 of the drawings, it will be seen that ring gear 50 has a frame 55 parts of which extend toward the axes of shafts 45 and 49 and are provided with a central gear 56. Since this gear 56 is fixed with the ring gear it will revolve in unison therewith around the axes of shafts 45 and 49. Additional gears 57 and 58 mesh with gear 56 for purposes which will be set forth hereinafter, one purpose being to drive fuel pump 27 and one or more lubricating and hydraulic system pumps 59. Gear 57 is arranged in mesh with one or more gears 60 to transmit rotary power to an accessory drive represented by a pulley 61 and belt 62. Gear 60 may also be employed to transmit rotary starting power from a starter motor 63 to the high pressure turbine through gears 57, 56, ring gear 50, planets 46, and sun gear 44. A suitable clutch 64 is disposed between starter motor 63 and gear 60 to disconnect the starter motor when self sustained operation of the high pressure turbocompressor unit is attained.

Another suitable clutch 65, in this instance a hydraulically operated one, is arranged between a gear train, including gears 66, 67, and gear 68, which connects gear 57, and consequently ring gear 50, and shaft 49 of the planet carrier. This gear train forms a part of the differential gear system which serves to transmit power from turbine 22 to the high pressure compressor, a torque converter 70 provided in the vehicle or other power utilizing means, and accessories. Fluid under pressure from pump 59, or other source, may be supplied via line 69 to clutch 65 to disengage it during certain operating phases of the differential system. For example, oil under pressure is applied to the clutch 65 to disengage it when power from the turbine 22 is being transmitted to a vehicle or other device utilizing the power unit. During such time no power is being transmitted through clutch 65. When oil pressure to clutch 65 is vented, or relieved, spring force in the clutch will cause the engagement of the clutch so that power may be transferred therethrough. At this time, the power unit may be in the braking or starting mode of operation. In the starting mode, power is applied by starting motor 63 through the gear train 60, 57, 56, 50, and 52 to the high pressure compressor. Rotary movement will also be applied through gears 46 and 44 to the turbine wheel 22. As the impeller 21 revolves air will be drawn in through line 53, valve 54, and a portion of line 19 to the inlet of compressor 21 and discharged therefrom through line 24 to the combustor 25. Fuel will be added through line 26 and the mixture ignited. The resulting gases will be applied to turbine 22 to impart rotary movement. The gases discharged from turbine 22 will be applied to turbine 13 causing this element to revolve and drive impeller 14 which will draw air into the inlet 15 and supply air under some pressure to the inlet of the high pressure compressor 21. The continued rotation of impeller 21 increases the pressure of the air and the volume of gases produced by the combustor 25 until operation of the high pressure unit becomes self-sustained. During the starting mode, power is transferred from the starter through the gear train 60, 57, 56, 50, 51, and 52 to the compressor and through the planet gears 46 and the sun gear 44 to the turbine 22.

Clutch 65 is also locked up by venting the oil pressure during the braking mode of operation, ie. when the vehicle is descending a hill or coming to a stop. At such time power is supplied by the vehicle tending to move under its own weight or due to inertia, through the torque converter 70 to the planetary carrier shaft 49. Power applied in this manner to this shaft will tend to cause the planet gears 46 to revolve the ring gear and the reaction will impart rotary power through the sun gear 44 to the turbine wheel 22. Power will also be transmitted through gears 68, 67, and 66, and clutch 65 to gear train 57, and 56, and to ring gear 50, pinion 52 to impeller 21 of the high pressure compressor.

The gears of the differential system must be so selected that the proper ratio will be provided to secure the most desirable compressor impeller and turbine wheel speeds.

It should be understood that locking up the clutch 65 serves to select a predetermined gear ratio which drives the high pressure compressor at the speed most efficient for the stage of operation existing at a particular time.

When the power unit is supplying power to a vehicle equipped with such unit to effect movement of the vehicle, the clutch 65 will be disengaged through the application of hydraulic pressure thereto via line 69.

The direction of operation of the vehicle or other mechanism provided with the power unit will be determined by a forward and reverse gear system (not shown) disposed between the torque converter 70 and the vehicle wheels. This system may also have a neutral condition for use when the vehicle is at rest or the power unit is idling.

I claim:
1. An engine comprising:
 a first stage having a rotor with compressor and turbine wheel sections;
 a second stage having separate compressor impeller and turbine wheel sections;
 a combustor receiving compressed air from the compressor impeller of the second stage;
 means supplying fuel to said combustor for mixture with the compressed air and ignition to generate heated gases;
 duct means for directing air flow serially through said compressor of the first stage, said compressor of the second stage and to said combustor, and for directing said heated gases from said combustor serially through said turbine of the second stage and said turbine of the first stage;
 differential gear means transmitting rotary movement from the turbine section of the second stage to the compressor impeller of said second stage; and
 an output shaft leading from said differential gear means to transmit variable torque to a point of use.

2. The engine of claim 1 in which an intercooler is disposed between the compressors of the first and second stages to cool the air flowing from the first compressor to the second compressor.

3. The engine of claim 1 in which a recuperator is disposed to pass the gases discharged from the turbine of the first stage into heat exchange relationship with the compressed air discharged from the compressor of the second stage prior to entry thereof into the combustor.

4. The engine of claim 1 in which the compressor of the first stage is provided with rotary guide vanes at the inlet thereof.

5. The engine of claim 1 in which the compressor of the second stage is provided with rotary guide vanes at the inlet thereof.

6. The engine of claim 1 in which the compressors of the first and second stages are provided with rotary guide vanes at the respective inlets thereof.

7. The engine of claim 6 in which means are provided to control the rotation of the rotary guide vanes at the inlets of the compressors.

8. The engine of claim 7 in which the means for controlling the rotation of the guide vanes at the inlets of the compressors includes a hydraulic system.

9. The engine of claim 7 in which the rotary guide vane rotation control means has a fluid pressure energy translating device connected with the rotary guide vanes of each compressor and a hydraulic system communicating with each fluid pressure energy translating device.

10. The engine of claim 1 in which the turbine of the first stage is provided with variable nozzles at the inlet thereof.

11. The engine of claim 1 in which the turbine of the second stage is provided with variable nozzles at the inlet thereof.

12. The engine of claim 1 in which the turbines of the first and second stages are provided with variable nozzles at the respective inlets thereof.

13. The engine of claim 1 in which the differential gear means has a sun gear connected with the turbine wheel section of the second stage, carrier means on the output shaft of said differential gear means, planet gears supported for rotation on said carrier and meshing with said sun gear, a ring gear with one set of teeth meshing with said planet gears, said ring gear having a second set of teeth, and a pinion connected with the compressor impeller of said second stage and meshing with said second set of teeth on said ring gear to be driven thereby.

14. The engine of claim 13 in which the teeth on the pinion on the compressor impeller of said second stage and the second set of teeth on said ring gear are of the bevel gear type.

15. The engine of claim 13 in which the ring gear of the differential gear means has a body with a central gear thereon and a gear train meshes with said central gear to transmit rotary motion therefrom to accessory drive means provided on said engine.

16. The engine of claim 15 in which a first clutch means are provided in connection with said gear train to selectively establish and interrupt a driving connection between said output shaft and predetermined gears of said differential gear means.

17. The engine of claim 13 in which a starter motor is provided and a second clutch means is arranged to selectively connect and disconnect the starter motor with the differential gear means through said gear train.

18. The engine of claim 1 in which an air inlet branch is connected between the outlet of the compressor of the first stage and the inlet to the compressor of the second stage and a check valve is disposed in said air inlet branch to prevent the flow of air outwardly therethrough.

19. The engine of claim 13 in which means are provided to selectively establish and interrupt a driving connection between the output shaft and said ring gear, such driving connection having a predetermined gear ratio and being operative when established to transmit power from an element connected with said output shaft to said ring gear.

20. The engine of claim 1 in which means are provided to selectively establish and interrupt a driving connection between the output shaft and predetermined parts of said differential gear means and being operative when such driving connection is established to transmit power from the point of use to the turbine and compressor of said second stage.

21. The engine of claim 1 in which a supplemental gear train meshes with predetermined gear means of said differential gear means, a starter motor, clutch means selectively connecting and disconnecting said starter motor with said supplemental gear train, and means including a second clutch means adapted to be selectively placed in active and inactive conditions, the active condition establishing a driving connection between said output shaft and the turbine and compressor of said second stage through said differential gear means, the gears of said driving connection having constant speed ratios with respect to each other, said driving connection serving to effect a power transfer from the point of use to the turbine and compressor of said second stage through said differential gear means when driving power is applied to said output shaft from the point of use and a power transfer to the turbine and compressor of said second stage through said supplemental gear train and differential gear means when said starter motor is energized.

* * * * *